United States Patent
Lepp et al.

(10) Patent No.: US 10,882,521 B2
(45) Date of Patent: Jan. 5, 2021

(54) METHOD AND SYSTEM FOR USE OF SENSORS IN PARKED VEHICLES FOR TRAFFIC SAFETY

(71) Applicant: BlackBerry Limited, Waterloo (CA)

(72) Inventors: James Randolph Winter Lepp, Ottawa (CA); Jeffrey Scott Dever, Kanata (CA)

(73) Assignee: BlackBerry Limited, Waterloo (CA)

(*) Notice: Subject to any disclaimer, the term of this patent is extended or adjusted under 35 U.S.C. 154(b) by 186 days.

(21) Appl. No.: 15/901,583

(22) Filed: Feb. 21, 2018

(65) Prior Publication Data

US 2019/0256091 A1  Aug. 22, 2019

(51) Int. Cl.
*B60W 30/095* (2012.01)
*H04W 4/46* (2018.01)
*B60W 40/04* (2006.01)
*G08G 1/01* (2006.01)
*G08G 1/14* (2006.01)
*G08G 1/0967* (2006.01)

(52) U.S. Cl.
CPC ........ *B60W 30/0956* (2013.01); *B60W 40/04* (2013.01); *G08G 1/0112* (2013.01); *G08G 1/096791* (2013.01); *G08G 1/143* (2013.01); *H04W 4/46* (2018.02); *B60W 2556/65* (2020.02)

(58) Field of Classification Search
None
See application file for complete search history.

(56) References Cited

U.S. PATENT DOCUMENTS

| | | | |
|---|---|---|---|
| 9,139,199 B2 | 9/2015 | Harvey | |
| 9,508,260 B2 | 11/2016 | Shaik | |
| 10,026,314 B1* | 7/2018 | Philosof | G08G 1/096791 |
| 2014/0012492 A1* | 1/2014 | Bowers | G08G 1/16 701/301 |
| 2015/0039218 A1* | 2/2015 | Bowers | B60W 30/0956 701/301 |
| 2015/0241880 A1* | 8/2015 | Kim | G05D 1/0287 701/25 |
| 2016/0117927 A1* | 4/2016 | Stefan | B60W 30/06 340/932.2 |
| 2016/0148513 A1 | 5/2016 | Beaurepaire | |
| 2016/0302046 A1* | 10/2016 | Velusamy | H04W 4/70 |
| 2016/0358475 A1* | 12/2016 | Prokhorov | G05D 1/0011 |

(Continued)

FOREIGN PATENT DOCUMENTS

| | | | |
|---|---|---|---|
| WO | 20170160562 A1 | 9/2017 | |
| WO | 2017192358 A1 | 11/2017 | |
| WO | WO-2017192358 A1 * | 11/2017 | G08G 1/162 |

OTHER PUBLICATIONS

European Patent Office, Extended European Search Report for Application No. 19156731.2, dated Jul. 23, 2019.

(Continued)

*Primary Examiner* — Peter D Nolan
*Assistant Examiner* — Demetra R Smith-Stewart
(74) *Attorney, Agent, or Firm* — Moffat & Co

(57) ABSTRACT

A method at computing device associated with a parked vehicle, the method including receiving a request for sensor information from an external computing device, the request including an area of interest; activating sensors of the parked vehicle; obtaining sensor data for the area of interest; and providing a response to the external computing device.

17 Claims, 14 Drawing Sheets

(56) References Cited

U.S. PATENT DOCUMENTS

| | | |
|---|---|---|
| 2017/0212511 A1 | 7/2017 | Paiva Ferreira et al. |
| 2017/0287338 A1 | 10/2017 | Neubecker et al. |
| 2018/0101736 A1* | 4/2018 | Han .......................... B60R 1/00 |
| 2018/0218607 A1* | 8/2018 | Baghel ................... G08G 1/162 |
| 2019/0213884 A1* | 7/2019 | Kim ........................ G01S 13/87 |

OTHER PUBLICATIONS

Society of Automotive Engineers (SAE International), J2945/1_201603, "On-Board System Requirements for V2V Safety Communications", published Mar. 30, 2016.

European Telecommunications Standards Institute (ETSI), ETSI EN 302 665 v.1.1.1, Intelligent Transport Systems (ITS) Communications Architecture, published Sep. 2010.

European Telecommunications Standards Institute (ETSI), Request for Comments #826, published Nov. 1982.

European Patent Office, Office Action1 for Application No. 19156731.2, dated Oct. 7, 2020.

\* cited by examiner

METHOD AND SYSTEM FOR USE OF SENSORS IN PARKED VEHICLES FOR TRAFFIC SAFETY

FIELD OF THE DISCLOSURE

The present disclosure relates to traffic safety systems, and in particular relates to traffic safety systems utilizing other vehicles.

BACKGROUND

Intelligent Transport Systems (ITS) are systems in which a plurality of devices communicate to allow for the transportation system to make better informed decisions with regard to transportation and traffic management, as well as allowing for safer and more coordinated decision-making. ITS system components may be provided within vehicles, as part of the fixed infrastructure, such as on bridges or at intersections, and for other users of the transportation systems, including vulnerable road users such as pedestrians or bicyclists.

ITS system deployment is receiving significant focus in many markets around the world, with radiofrequency bands being allocated for the communications. In addition to the vehicle to vehicle communications for safety critical and non-critical applications, further enhancements to provide systems or applications are being developed for vehicle to infrastructure and vehicle to portable scenarios.

However, infrastructure based ITS systems are expensive to deploy. For example, on a city street, many sensors would need to be deployed to provide information about pedestrians that may start crossing a street outside of a designated crosswalk. Such system may be prohibitively expensive for a municipality to deploy and maintain, and thus such system may not be deployed, leaving vulnerable road users less safe. In other cases, parking lots or structures may not deploy fixed infrastructure to aid in vehicle parking based on costs. Other examples are possible.

BRIEF DESCRIPTION OF THE DRAWINGS

The present disclosure will be better understood with reference to the drawings, in which.

DETAILED DESCRIPTION OF THE DRAWINGS

Figure 1:
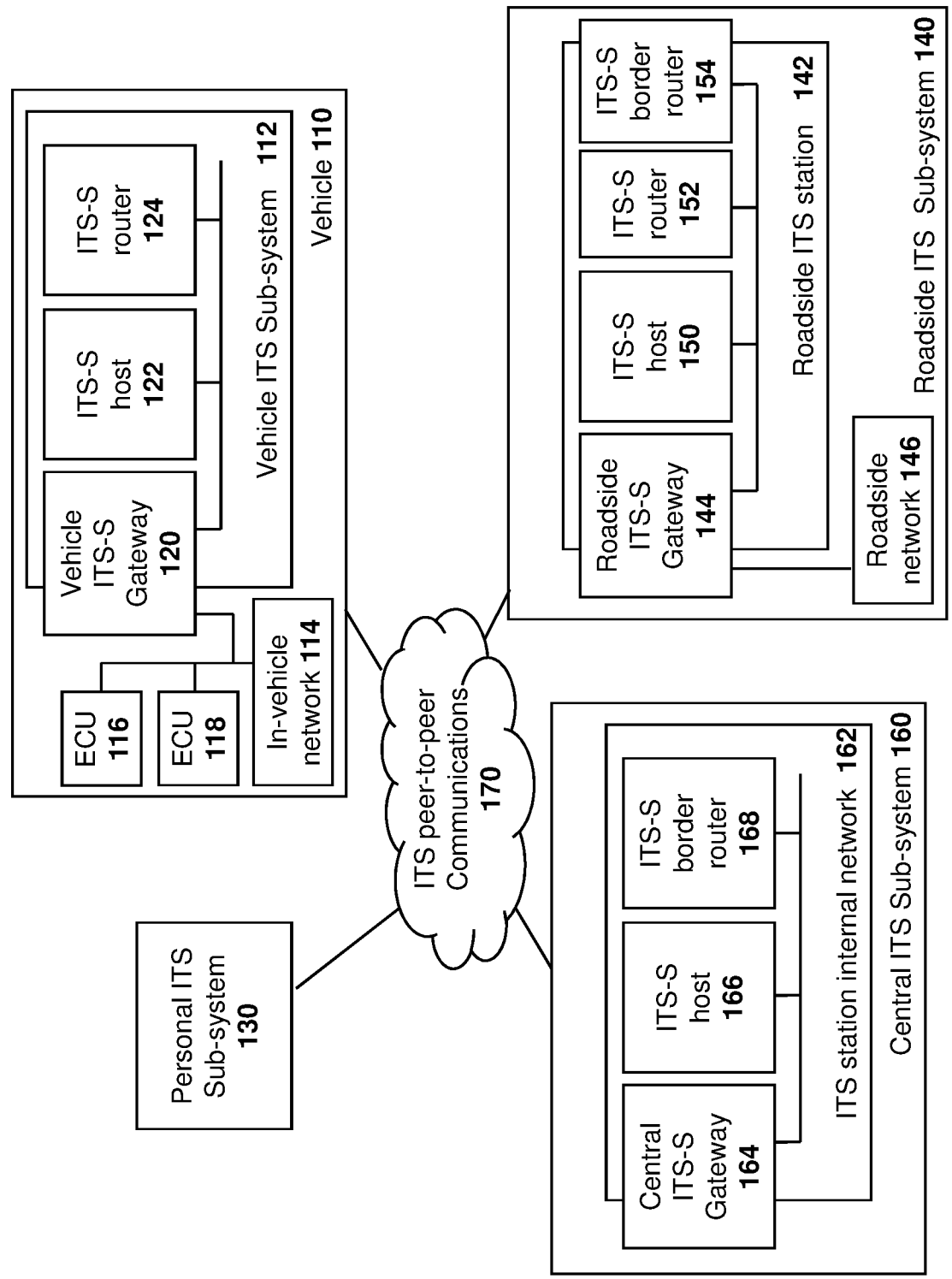
FIG. 1 is a block diagram of an intelligent transportation system.

The present disclosure provides a method at a computing device associated with a parked vehicle, the method comprising: receiving a request for sensor information from an external computing device, the request including an area of interest; activating sensors of the parked vehicle; obtaining sensor data for the area of interest; and providing a response to the external computing device.

The present disclosure further provides a computing device associated with a parked vehicle, the computing device comprising: a processor; and a communications subsystem, wherein the computing device is configured to: receive a request for sensor information from an external computing device, the request including an area of interest; activate sensors of the parked vehicle; obtain sensor data for the area of interest; and provide a response to the external computing device.

The present disclosure further provides a computer readable medium for storing instruction code which, when executed by a processor of a computing device associated with a parked vehicle, cause the computing device to: receive a request for sensor information from an external computing device, the request including an area of interest; activate sensors of the parked vehicle; obtain sensor data for the area of interest; and provide a response to the external computing device.

Intelligent Transportation System software and communication systems are designed to enhance road safety and road traffic efficiency. Such systems include vehicle to/from vehicle (V2V) communications, vehicle to/from infrastructure (V2I) communications, vehicle to/from network (V2N) communications, and vehicle to/from pedestrian or portable (V2P) communications. The communications from a vehicle to/from any of the above may be generally referred to as V2X. Further, other elements may communicate with each other. Thus, systems may include portable to/from infrastructure (P2I) communications, infrastructure to infrastructure (I2I) communications, portable to portable (P2P) communications, among others.

Such communications allow the components of the transportation system to communicate with each other. For example, vehicles on a highway may communicate with each other, allowing a first vehicle to send a message to one or more other vehicles to indicate that it is braking, thereby allowing vehicles to follow each other more closely.

Communications may further allow for potential collision detection and allow a vehicle with such a device to take action to avoid a collision, such as braking or steering. For example, an active safety system on a vehicle may take input from sensors such as cameras, radar, lidar, and V2X, and may act on them by steering or braking, overriding or augmenting the actions of the human driver. Another type of advanced driver assistance system (ADAS) is a passive safety system that provides warning signals to a human driver to take actions. Both active and passive safety ADAS systems may take input from V2X and ITS systems.

In other cases, fixed infrastructure may give an alert to approaching vehicles that they are about to enter a dangerous intersection or alert vehicles to other vehicles or pedestrians approaching the intersection. This alert can include the state of signals at the intersection (signal phase and timing (SPaT)) as well as position of vehicles or pedestrians or hazards in the intersection. Other examples of ITS communications would be known to those skilled in the art.

Reference is now made to FIG. 1, which shows one example of an ITS station, as described in the European Telecommunications Standards Institute (ETSI) European Standard (EN) 302665, "Intelligent Transport Systems (ITS); communications architecture", as for example provided for in version 1.1.1, September 2010.

In the embodiment of FIG. 1, a vehicle 110 includes a vehicle ITS sub-system 112. Vehicle ITS sub-system 112 may, in some cases, communicate with an in-vehicle network 114. The in-vehicle network 114 may receive inputs from various electronic control unit (ECUs) 116 or 118 in the environment of FIG. 1.

Vehicle ITS sub-system 112 may include a vehicle ITS Station (ITS-S) gateway 120 which provides functionality to connect to the in-vehicle network 114.

Vehicle ITS sub-system 112 may further have an ITS-S host 122 which contains ITS applications and functionality needed for such ITS applications.

Further, an ITS-S router 124 provides the functionality to interconnect different ITS protocol stacks, for example at layer 3. ITS-S router 124 may be capable of converting protocols, for example for the ITS-S host 122.

Further, the ITS system of FIG. 1 may include a personal ITS sub-system 130, which may provide application and communication functionalities of ITS communications (ITSC) in handheld or portable devices, such as personal digital assistants (PDAs), mobile phones, user equipment, among other such devices.

A further component of the ITS system shown in the example of FIG. 1 includes a roadside ITS sub-system 140, which may contain roadside ITS stations and interceptors such as on bridges, traffic lights, among other options.

The roadside sub-system 140 includes a roadside ITS station 142 which includes a roadside ITS-S gateway 144. Such gateway may connect the roadside ITS station 142 with proprietary roadside networks 146.

A roadside ITS station may further include an ITS-S host 150 which contains ITS-S applications and the functionalities needed for such applications.

The roadside ITS station 142 may further include an ITS-S router 152, which provides the interconnection of different ITS protocol stacks, for example at layer 3.

The ITS station 142 may further include an ITS-S border router 154, which may provide for the interconnection of two protocol stacks, but in this case with an external network.

A further component of the ITS system in the example of FIG. 1 includes a central ITS sub-system 160 which includes a central ITS station internal network 162.

Central ITS station internal network 162 includes a central ITS-S gateway 164, a central ITS-S host 166 and a ITS-S border router 168. ITS-S gateway 164, central ITS-S host 166 and ITS-S border router 168 have similar functionality to the gateway 144, ITS-S host 150 and ITS-S border router 154 of the roadside ITS station 142.

Communications between the various components may occur through a ITS peer-to-peer communications network 170.

The system of FIG. 1 is however merely one example of an ITS system.

As indicated above, however, the use of infrastructure ITS components may be prohibitively expensive. In this regard, a vehicle may be dependent on its own sensors for object detection.

Figure 2:
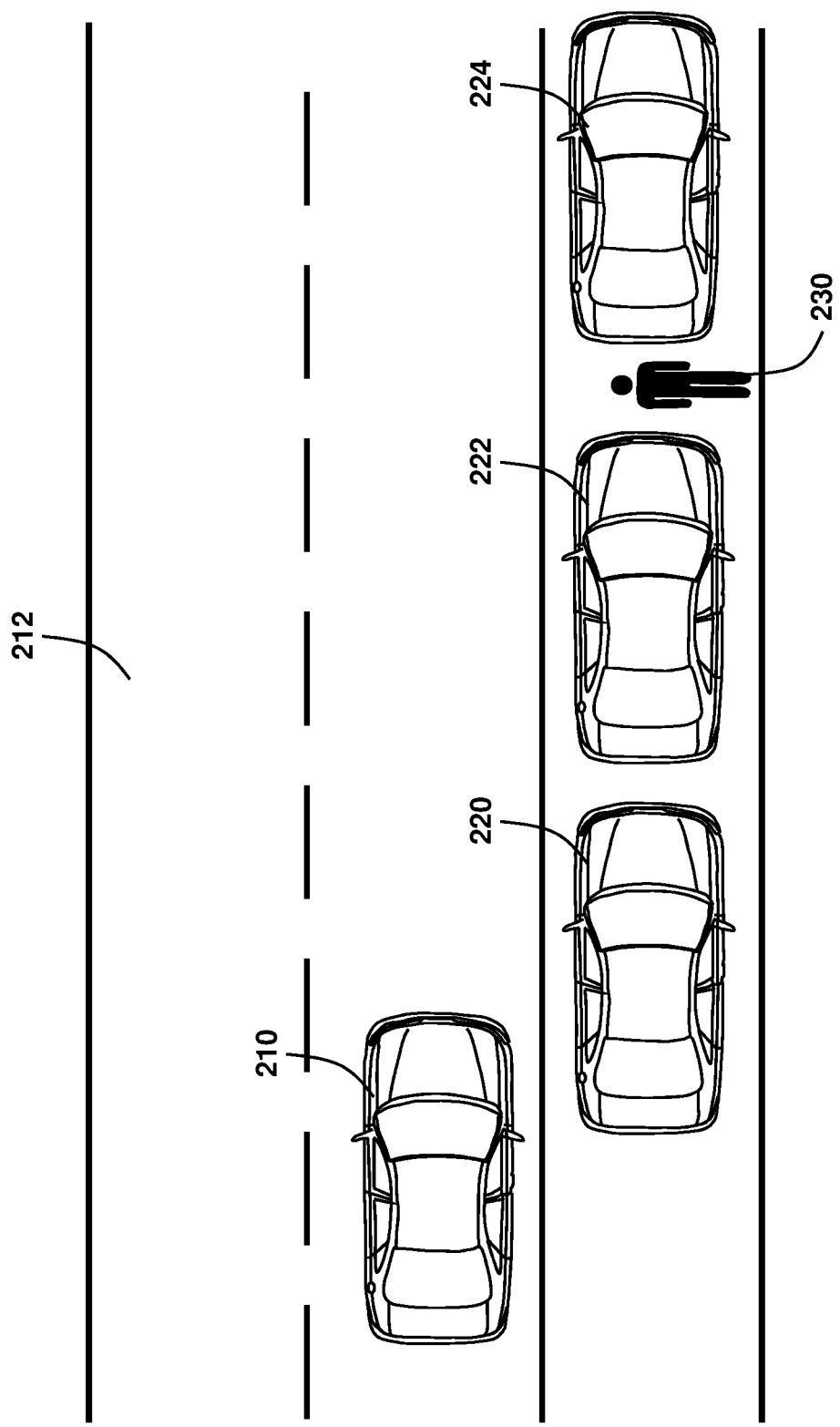
FIG. 2 is a block diagram showing a moving vehicle having a view of a pedestrian blocked by a row of parked vehicles.

For example, reference is now made to FIG. 2. In the embodiment of FIG. 2, a vehicle 210 is travelling down a street 212. The street includes a number of parked vehicles, including vehicles 220, 222 and 224, on the edge of street 212.

Sensors on vehicle 210 may not be able to detect a pedestrian 230 that is crossing between vehicles 222 and 224. For example, pedestrian 230 may be a child and thus may not be visible behind vehicle 222. In other embodiments vehicle 222 may be a large vehicle such as a van which obstructs the view from vehicle 210 of the sidewalk and of pedestrian 230. Thus, pedestrian 230 is in a blind area that none of the sensors such as camera, lidar, radar, among others, on vehicle 210 can detect.

Figure 3:
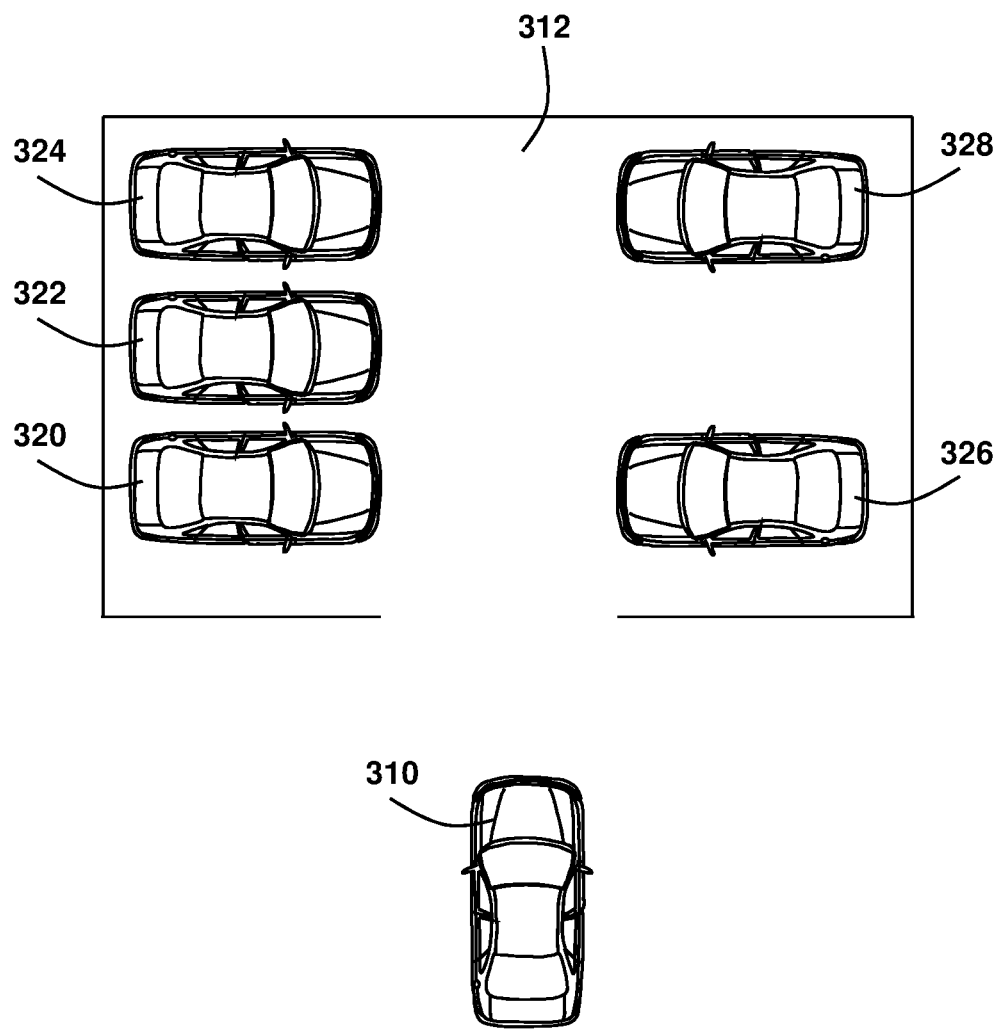
FIG. 3 is a block diagram of a simplified parking structure.

Vehicle assistance may also be affected by lack of infrastructure components. An example is illustrated with regard to FIG. 3. In the embodiment of FIG. 3, a vehicle 310 may be attempting to park in a parking lot 312. The parking lot may not have any ITS fixed infrastructure, for example due to costs, or it may have limited infrastructure for billing and communications and not a widely deployed network of sensors. In this regard, vehicle 310 may not know where to park or which parking areas are available.

This may further be an issue if vehicle 310 is an autonomous vehicle relying on sensors to find a parking spot. For example, in the embodiment of FIG. 3, the parking lot includes vehicles 320, 322, 324, 326 and 328. The parking lot is full, with the exception of one spot between vehicles 326 and 328.

Without ITS infrastructure to guide vehicle 310, the vehicle will need to rely on its sensors to find the available spot. While the embodiment of FIG. 3 is a simplified example, in a larger parking lot it may be difficult for vehicle 310 to find the available parking spot. It is less efficient for the vehicle to drive around trying to find an available space than to just drive directly to the available space.

While deploying infrastructure sensors is expensive, vehicles may currently have, and in the future will likely have, advanced sensors such as cameras, lidar, radar, among other such sensors, that are used while in driving scenarios. In accordance with the embodiments of the present disclosure, such sensors may also be leveraged when a vehicle is parked for the benefit of other vehicles within the transportation system.

In various embodiments of the present disclosure, a computing device associated with a parked vehicle may determine when to use sensors and when to not use sensors. Such determination is used to optimize power usage in a parked vehicle. Specifically, sensors and communications systems in a vehicle typically use the vehicle's battery. In various embodiments described below, the parked vehicle may not provide detection services until the parked vehicle receives requests from vehicles on the road via a radio communication. This may save battery resources on the parked vehicle by limiting when the sensors are operated. Further, communication may be optimized to limit battery usage.

Communication directly between a moving vehicle and a parked vehicle may utilize vehicle to vehicle communications. This may be done via a unicast communication, which requires vehicle identification in order to address the request. Vehicle to vehicle communications may also be done utilizing broadcast requests. In this regard, the broadcast request may cause the receipt of multiple responses that should be dealt with.

Further, in various embodiments, the parked vehicle may communicate with infrastructure. For example, in the parking lot scenario, a parked vehicle may agree to utilize its sensors to receive a reduction in the cost of parking. In this regard, in various embodiments described below, capability negotiation, sensor usage binding, and latency issues are described.

Further, with regard to various embodiments described below, the communication between a parked vehicle and another vehicle or infrastructure component is size limited in order to reduce latency and overhead for processing at both the parked vehicle and the infrastructure component or the moving vehicle. In this regard, various embodiments described provide a region description in a request to identify areas where blind spots exist. Further, a single request may in some instances receive multiple responses, where the region of interest may change based on the single request and the rate of movement of the moving vehicle.

In the embodiments below, interactions between a moving vehicle and parked vehicle are described. However, this is not limiting and in other cases the moving vehicle may be replaced by other road users, including bicyclists, pedestrians, among others. For example, a mobile device carried by a bicyclist may interact with parked vehicles in a manner similar to the moving vehicle described below. Thus the present disclosure is not limited to moving vehicle road users.

Requesting Sensor Data from Parked Vehicles

Figure 4:
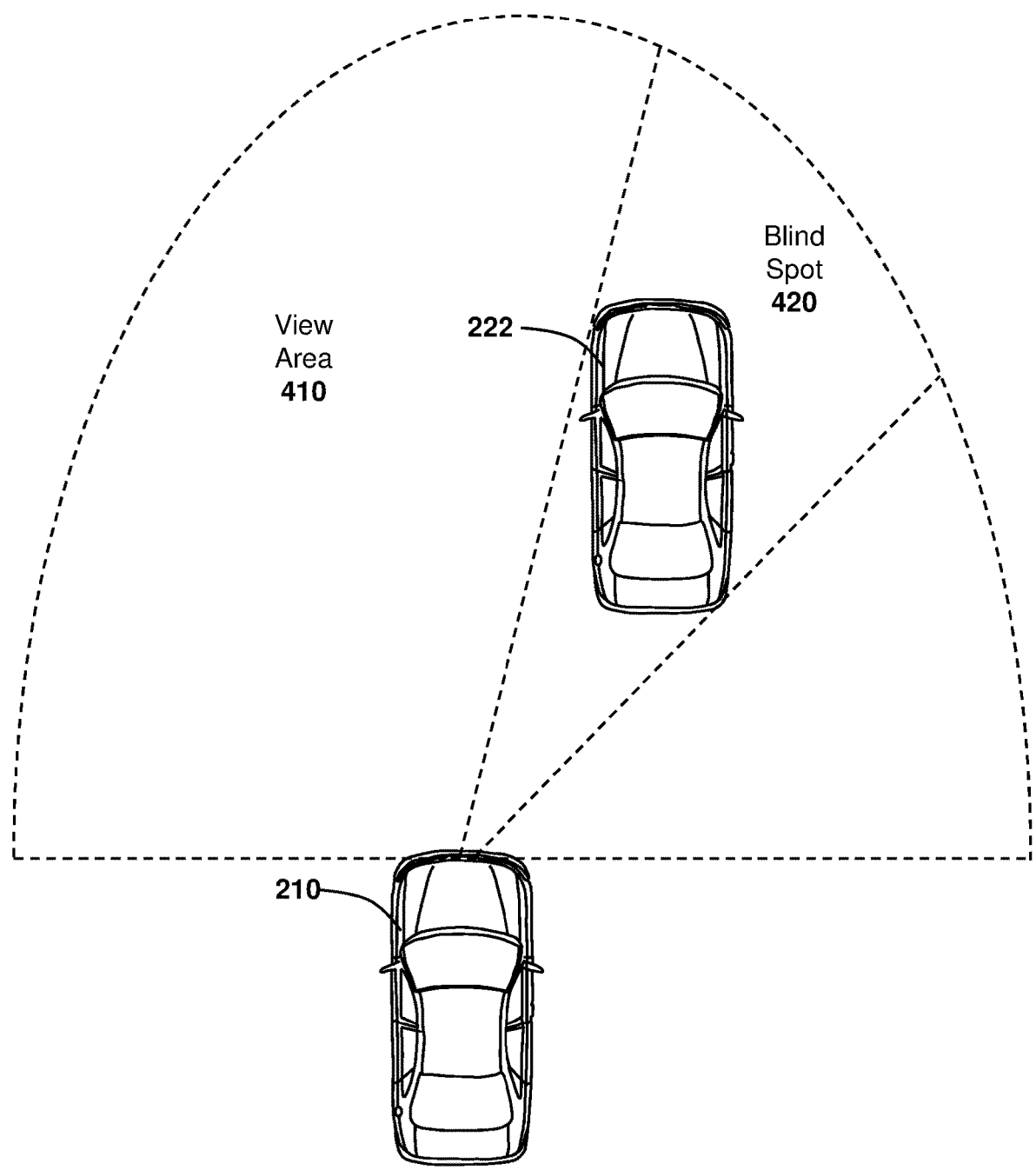
FIG. 4 is a block diagram showing a view area and a blind spot area for a parked vehicle.

Reference is now made to FIG. 4. In the embodiment of FIG. 4, vehicle 210 is progressing down the street and a computing device on the vehicle, such as a vehicle head unit, is reading the environment utilizing sensors. In particular, the computing device on vehicle 210 has a view area 410 showing the environment in front of the vehicle.

The computing device on vehicle 210 detects that the "view" of a certain sector of the environment is being blocked by another vehicle 222. For example, vehicle 222 may be a larger vehicle such as a van, or may simply be any vehicle that is parked at the side of the street.

As seen in FIG. 4, the view from vehicle 210 is being blocked by vehicle 222, creating a blind spot 420.

In accordance with one embodiment of the present disclosure, a computing device on vehicle 210 may interact with a computing device on vehicle 222 to receive information for blind spot 420 in order to enhance the safe operation of a vehicle 210. In particular, as described below, the computing device on vehicle 210 may send a request to the computing device on vehicle 222 with a description of the view or region that it is requesting. Such request may include parameters such as angle, range, direction, type of sensor, among other factors.

Figure 5:
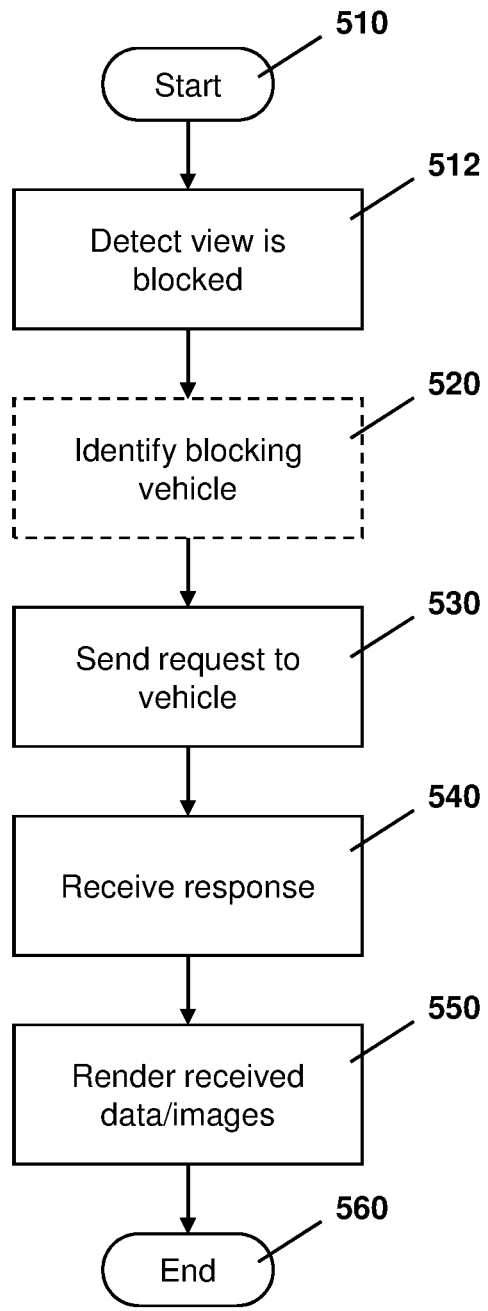
FIG. 5 is a process diagram of a process at a computing device of a moving vehicle for obtaining information about a blind spot area.

Reference is now made to FIG. 5, which shows a process at a computing device within a moving vehicle for obtaining information about blind spots created by parked vehicles. The process of FIG. 5 starts at block 510 and proceeds to block 512 in which the computing device on the moving vehicle detects that its view is being blocked by another vehicle.

The process may then optionally proceed to block 520 in which the vehicle that is blocking the view of the moving vehicle is identified. Such identification may be based on information received in broadcast signals from the stationary vehicle, identifying information on the parked vehicle such as license plate number or printed information, among other options.

If vehicle identification does not occur, or from block 520, the process proceeds to block 530 in which a request is sent to the computing device of the parked vehicle. The request that is sent to the parked vehicle may include various information. For example, the request may include an address for the vehicle if one was identified at block 520. In this case, the request may be a unicast request directly between the moving vehicle and the parked vehicle.

Alternatively, the request being sent at block 530 may be a broadcast request applying to all vehicles within range of the broadcast. In this case, the request may include a broadcast address to indicate that such message is a broadcast message. As will be appreciated by those in the art, a broadcast request does not require a difficult identification step 520 and therefore can have a lower average latency. Further, such broadcast message may create multiple points of view from different vehicles receiving the request. This may allow the system to work in the mixed environment of connected and unconnected vehicles.

Figure 6:
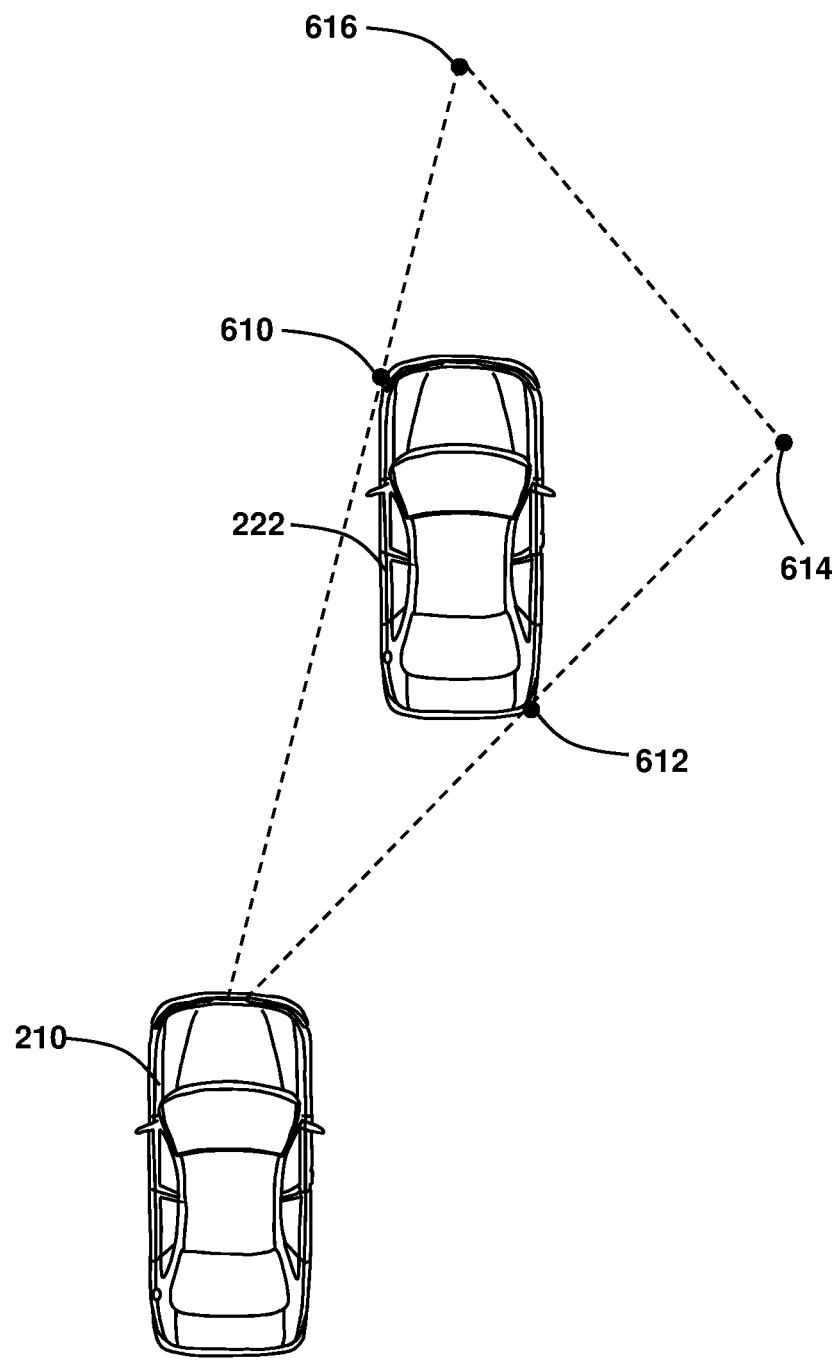
FIG. 6 is a block diagram showing the creation of a quadrilateral area of interest.

In some cases, the request sent at block 530 may include a location, area or volume from which information is being requested. For example, this could be represented as four points forming a quadrilateral. Reference is now made to FIG. 6. As seen in the embodiment of FIG. 6, the computing device on vehicle 210 may create a quadrilateral by including the points 610 and 612, which represent the corners of vehicle 222, within the request. Further, the quadrilateral may include points 614 and 616 which represent far points of the quadrilateral and can be sufficiently distant from vehicle 222 to create an area of interest. As will be appreciated by those skilled in the art, the request could include all four points, or could include only points 614 and 616, leaving the receiving vehicle to use its corners as the remaining points.

Points 610, 612, 614 and 616 may be identified using absolute coordinates, such as by using Global Navigation Satellite System coordinates, in some embodiments. In other embodiments, the points may be relative coordinates based on the location of vehicle 222 or vehicle 210. The points may be identified using cartesian coordinates, polar coordinates or another system of describing points or areas. Other options for providing the points in the request are possible.

Figure 7:
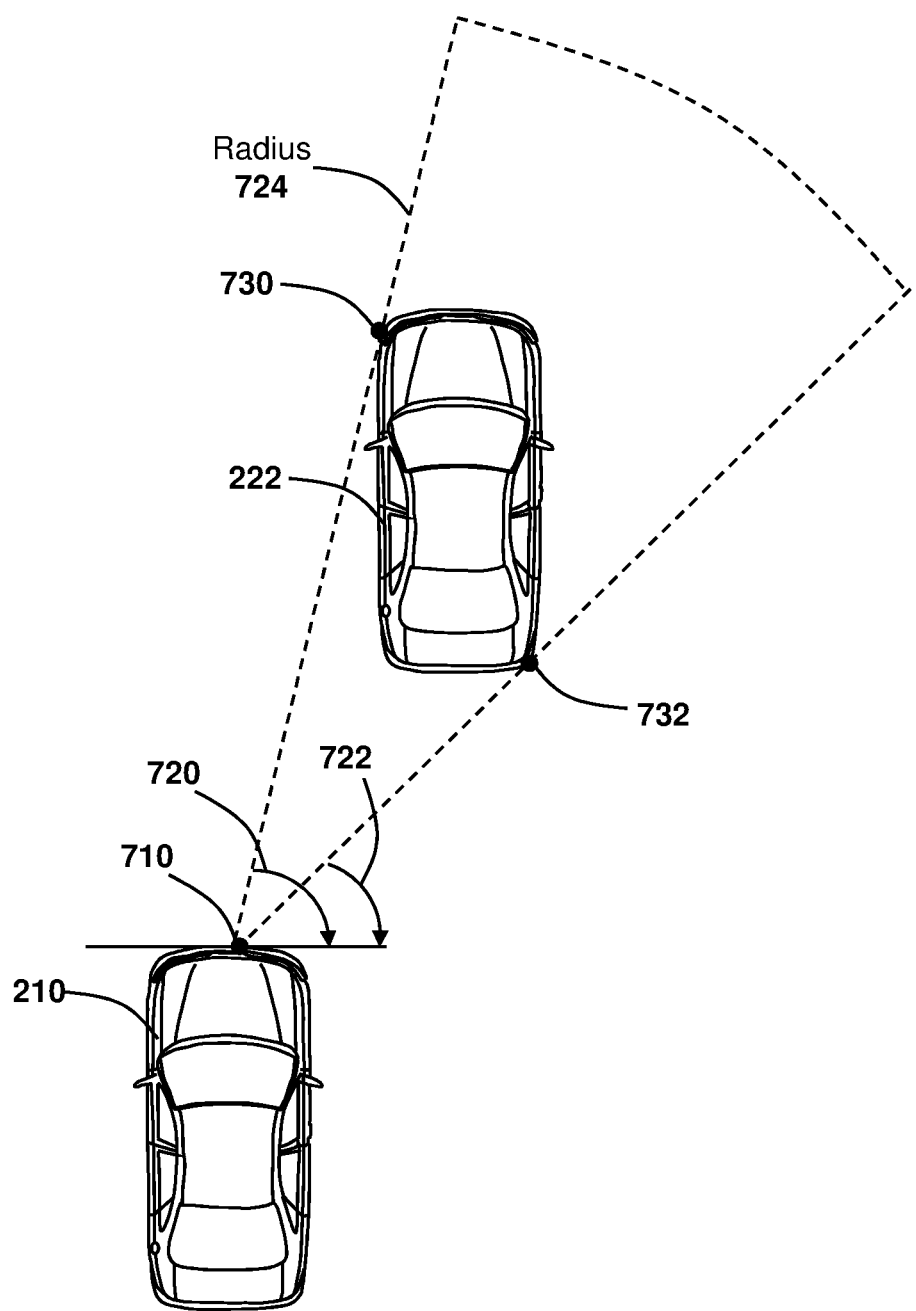
FIG. 7 is a block diagram showing creation of a pie shaped area of interest based on angles and a radius.

Alternatively, the area identified in the request of block 530 could be based on angles. Reference is now made to FIG. 7. Vehicle 210 may have a central point 710 representing a sensor location for the vehicle. As such, the request could have a first angle 720 and a second angle 722, along with a radius 724 in some embodiments. For example, angle 720 could represent the angle between a line perpendicular to the direction of travel and a line drawn between point 710 and a corner 730 of vehicle 222. Angle 722 could represent an angle between a line perpendicular to the direction of travel of the vehicle and a line from the point 720 to a corner 732 representing a further corner of vehicle 222.

However, in other embodiments the angle may be based on a line drawn parallel to the direction of travel rather than perpendicular to the direction of travel.

Further, in some cases point 710 may be a different point on vehicle 210, including but not limited to the center of vehicle 210.

In still further cases, angle 720 may have a different starting point 710 than angle 722. For example, the angles may represent starting points on opposite sides of the front of the vehicle.

Other options for the angles provided in the request are possible, as long as both the computing devices on the moving vehicle and the parked vehicle interpret the angles in the same way.

Further, in the embodiment of FIG. 7, a radius 740 may provide a distance from the vehicle to a far point, indicating a region beyond vehicle 222 that vehicle 210 is interested in. However, in other embodiments, such radius may not be provided and in this case the computing device on vehicle 222 may decide the distance for the reporting area beyond the vehicle represented by angles 720 and 722.

Thus, in accordance with FIG. 7, the area of interest may be represented as a center of a circle described by a GNSS or similar coordinates, plus two angles, and potentially a radius, which represent a pie shape. The area of interest is further limited to the side of the parked vehicle opposite point 710 in one embodiment.

Referring back to FIG. 5, the request at block 530 may further include a length of time that the request is valid for. This may, for example, be determined by the speed of the moving vehicle and therefore the length of time that the blind spot based on the parked vehicle will exist.

In one embodiment the request at block 530 may further include a frequency or period that the computing device of vehicle 210 would like to get reports. Thus, for example, if the vehicle is moving relatively quickly then a snapshot of the area beyond the parked vehicle may be sufficient. In other cases, the computing device may require updates periodically. For example, the computing device on the moving vehicle may request an update every one hundred milliseconds. Other time periods or frequencies could however be used.

Further, in some cases, authentication information may be provided by the moving vehicle to secure the communications between the moving vehicle and parked vehicle. This can be used to verify the authenticity of the vehicle or device within the vehicle or infrastructure sending the data. It may also be used to provide privacy of sensitive communication such as identifying information or other similar data data. In some cases, authentication may be done based on lists of authenticated vehicles provided by a network, or a network component could be involved with the authentication.

In some cases, the computing device on the moving vehicle may further provide its direction of travel and speed of travel. As will be appreciated by those in the art, this may be relevant to alter the blind spot area that is required for reporting. Specifically, if a vehicle is moving at a constant speed in a constant direction, for example down a road, then the angles required for the blind spot will change over time. Such angles may be calculated by the computing device on the parked vehicle and therefore the periodic reporting by the parked vehicle may be altered based on the direction and speed of the moving vehicle. The area reported on in each periodic report changes for each period as the calculated blindspot area moves with the passing vehicle.

Other options for information contained within the request at block 530 are possible. Further in some cases, not all the information described above may form part of the request at block 530.

From block 530, the process proceeds to block 540 in which the computing device of the moving vehicle receives a response. The response received at block 540 may be a unicast message based on identification information found within request sent at block 530. The unicast message may include sensor information.

In some embodiments, the sensor information may be raw sensor data as collected by the computing device of the parked vehicle and provided to the computing device of the moving vehicle. For example, an image captured by a camera on the parked vehicle may be included in the response.

In other cases, the computing device of the parked vehicle may perform processing and provide data with regard to potential hazards or other risks in order to minimize the data transfer between the parked vehicle and the moving vehicle. Other options are possible.

Further, in other cases, the response received at block 540 may be a broadcast response.

Once the response at block 540 is received, the process proceeds to block 550 in which the data within the response is rendered to provide an indication of whether a hazard exists. Such rendering may include image processing, or analyzing the radar or lidar data, for example.

Further, in the case of a "passive system", information may be displayed to a user. For example, if a user wanted to check what is behind a parked car, in some embodiments the user could simply touch an image or representation of the vehicle on a vehicle navigation system to have a view pop up. The navigation system could indicate whether the view is available, for example by highlighting the parked vehicle or some other visual cue. The highlighting could either mean that the vehicle is available for sending a request (its sensors are available) or it could indicate that a computing device on the user's vehicle has already received a broadcast message with the view or information.

The process then proceeds to block 560 and ends.

Figure 8:
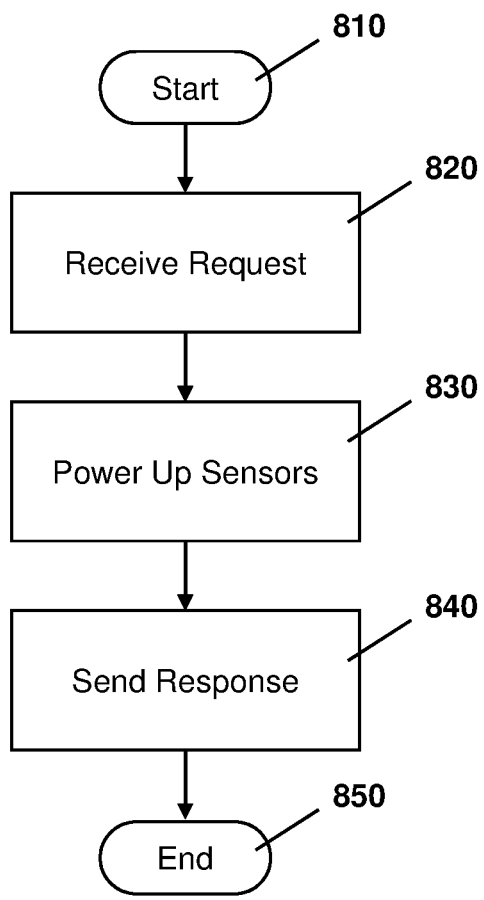
FIG. 8 is a process diagram of a process at a computing device on a parked vehicle for receiving and responding to a request for sensor information from a moving vehicle.

From the perspective of the parked vehicle, a request is received by the computing device, and a response to the request may be provided. Reference is now made to FIG. 8.

The process of FIG. 8 starts at block 810 and proceeds to block 820 in which a request is received. The request received is the request sent at block 530 and can include various information such as an address, the location, area or volume of interest, the length of time the request is valid for, the frequency or period of the responses, authentication information, moving vehicle direction and speed, and/or other data as required.

Based on the received request, the process may proceed to block 830 in which the relevant sensors are powered up. For example, the parked vehicle may include a lidar and lidar sensor data is being requested in the received request. In this regard, the computing device of the parked vehicle may power up its lidar sensors to obtain lidar data. In other cases, camera data may be requested and in this case an image may be captured and sent back to the requesting vehicle. In other cases, radar data may be requested. Other types of data may also be requested or a combination of various sensors may be requested, and in this case, the computing device of the parked vehicle powers up the relevant sensors at block 830.

The relevant sensors may further be limited based on the orientation of the parked vehicle relative to the roadway. For example, a vehicle parked parallel to a roadway and facing the same direction as the direction of travel may power up sensors only near the front of the vehicle on the curb side of the vehicle to save battery power. As such, a subset of the overall sensors in the vehicle is used, and in general a different set of sensors is used while parked than while driving.

Once the sensors are powered up, sensor data may be collected and the process may then proceed to block 840 in which the response is sent back to the requesting vehicle. The response may be sent as a unicast message based on information within the request or may be sent as a broadcast message.

Figure 9:
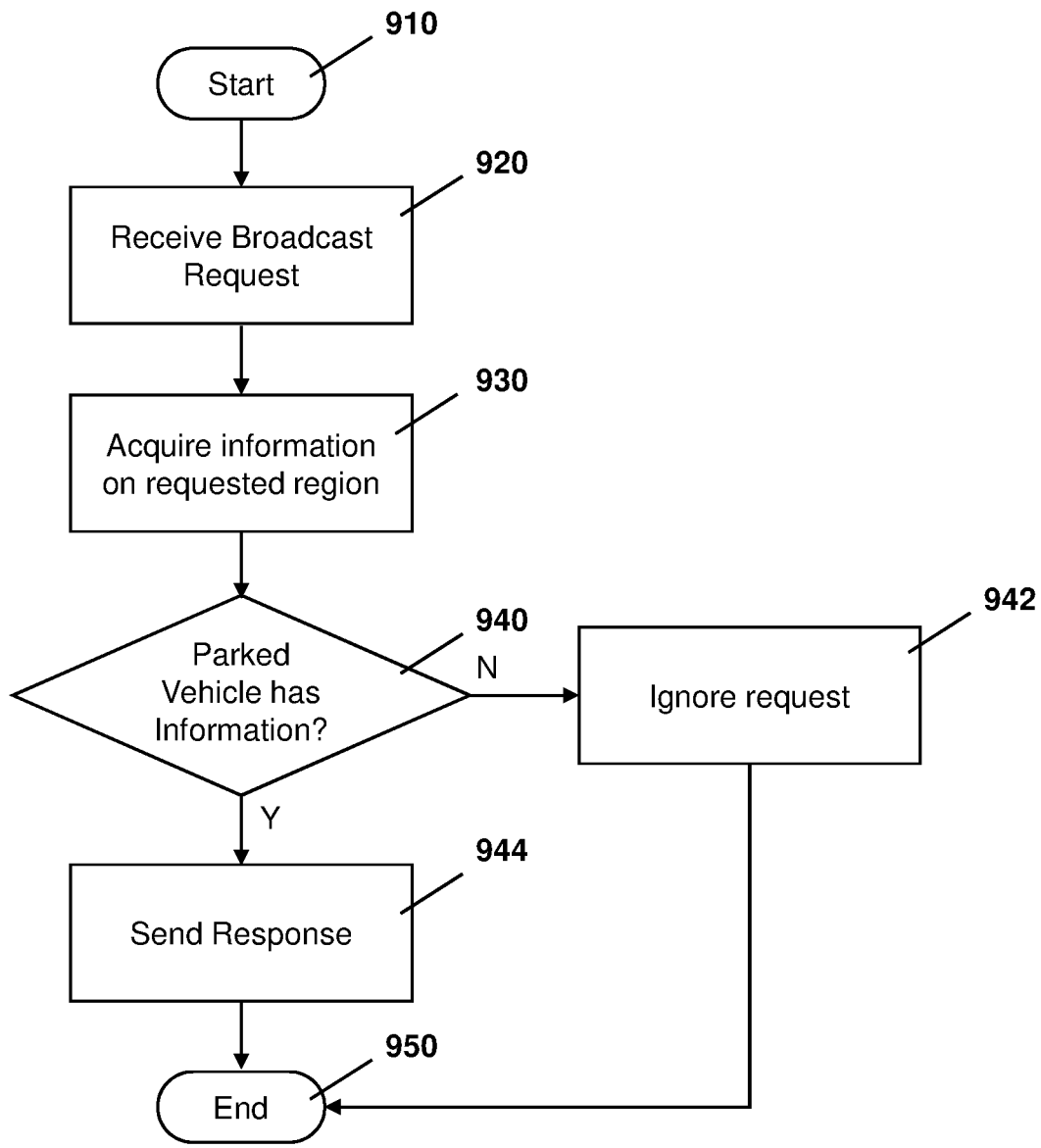
FIG. 9 is process diagram of a process at a computing device on a parked vehicle for receiving and selectively responding to a request for sensor information from a moving vehicle.

Alternatively, the computing device of the parked vehicle may determine whether there is any information of interest to the moving vehicle before sending a response. Reference is now made to FIG. 9. In the embodiment of FIG. 9, the process starts at block 910 and proceeds to block 920 in which a broadcast request for information is received. Such broadcast request may include the information described above for the request sent at block 530.

From block 920 the process may proceed to block 930 in which the current information for the requested region is acquired. This assumes the parked vehicle has the capability to obtain such information. If the vehicle does not have such ability, the request may be ignored at this stage.

From block 930 the process proceeds to block 940 in which a check is made to determine whether the parked vehicle has any relevant information. If not, the process may proceed to block 942 in which the request is ignored and the process may then proceed to block 950 in which the process ends.

Alternatively, if the computing device on parked vehicle has relevant information, the process may then proceed to block 944 in which a response to the request is sent.

From block 944 the process proceeds to block 950 and ends.

In some cases, object reporting can be done in a manner to minimize information that is communicated. For example, the surface of a detected object or hazard could be represented as a point cloud and compressed using techniques of point cloud compression.

Thus, based on FIGS. 5 to 9 above, a moving vehicle or other road user may send information requests to a parked vehicle to obtain information with regard to the objects within a blind spot caused by the parked vehicle. The blind spot may be defined as a quadrilateral based on absolute or relative coordinates. These coordinates may be determined based on the moving vehicle's position and readings from radar or lidar that can be used to determine the distance and angle of the blocking objects, for example through extrapolation. The shape may be changing as the vehicle is moving. Thus, the moving vehicle may calculate the quadrilateral representing its current blind spot and may make multiple requests to the parked vehicle.

Alternatively, the quadrilateral may be calculated based on a trajectory of the moving vehicle and a region of interest may be computed by the computing device on parked vehicle for multiple responses to a single request from the moving vehicle.

In some cases, the requested region may be slightly larger than the actual blind spot to account for sensor accuracy at the edges of the view and to verify certain sensor readings of the moving vehicle. While inefficient from a communications perspective, the extra information may be used at the moving vehicle as duplicate information to provide higher confidence in the sensor readings.

Alternatively, the computing device on the moving vehicle may request information for a current blind region and a future driving region. The computing device may ask for only objects present in the blind region that are headed into the driving region. The parked vehicle may then respond by filtering only hazards or threats heading into the moving vehicle's path. Additional objects detected by sensor readings within the blind region which are not a hazard to the moving vehicle are not reported. This may save the bandwidth for the communications between the two vehicles.

The response may not only be a single message or a single sensor reading. Rather, the computing device on the parked vehicle may repeat responses with more data until a moving vehicle leaves its range.

In some cases, the computing device on the moving vehicle may send multiple requests, possibly requesting the same region or possibly requesting a different angle shape or region with each request.

Alternatively, the request could include a rate and direction of motion and a sampling rate. This enables the respondent to send multiple responses in sequence to a single request for the requested length of time. The series of response messages can then utilize compression by sending only a delta or otherwise compress information in the sequence of responses.

Signaling between the moving vehicle and parked vehicle could also include "renew" message to compress subsequent requests. Such renew message would be interpreted as asking for the same data as a previous request.

Further, the computing device on the parked vehicle may filter its sensor readings and respond only with moving object data. In this case, sensors may scan the area but do not send reports on stationary objects, for example including parking meters or buildings, back to the moving vehicle. In addition to filtering for only objects that are in motion, the sensor readings may be further filtered to send only reports on objects moving in the direction in which they would become a hazard or potential hazard to the moving vehicle.

In one embodiment, the request from the moving vehicle and the response may be stateless. In this regard, each request does not require any state or delta of the previous request from the same station or vehicle.

The moving vehicle may take action in response to received sensor data from the parked vehicle. One action may be to apply the brakes and to stop, perhaps due to a detected hazard entering or about to enter the roadway.

Other actions may be to slow down due to a detected potential hazard as a precaution in case a person/object/hazard enters the roadway. Alternatively, the vehicle can speed up or maintain a high speed as it gains confidence that there are no hazards in blind spot areas. Alternatively, if the blind spot remains unknown without received sensor data from a parked vehicle, the moving vehicle may slow down to account for the unknown regions.

Sensor Events from Parked Vehicles

In accordance with a further embodiment of the present disclosure, a computing device on a parked vehicle may maintain a subset of sensors in operation while it is parked. The computing device may then send out hazard reports, or perceived object reports, to nearby vehicles or ITS recipients in response to the subset of sensors detecting certain objects or events. Thus, in accordance with the present embodiment, the computing device of the parked vehicle sends messages or reports without first receiving a request from a moving vehicle.

Figure 10:
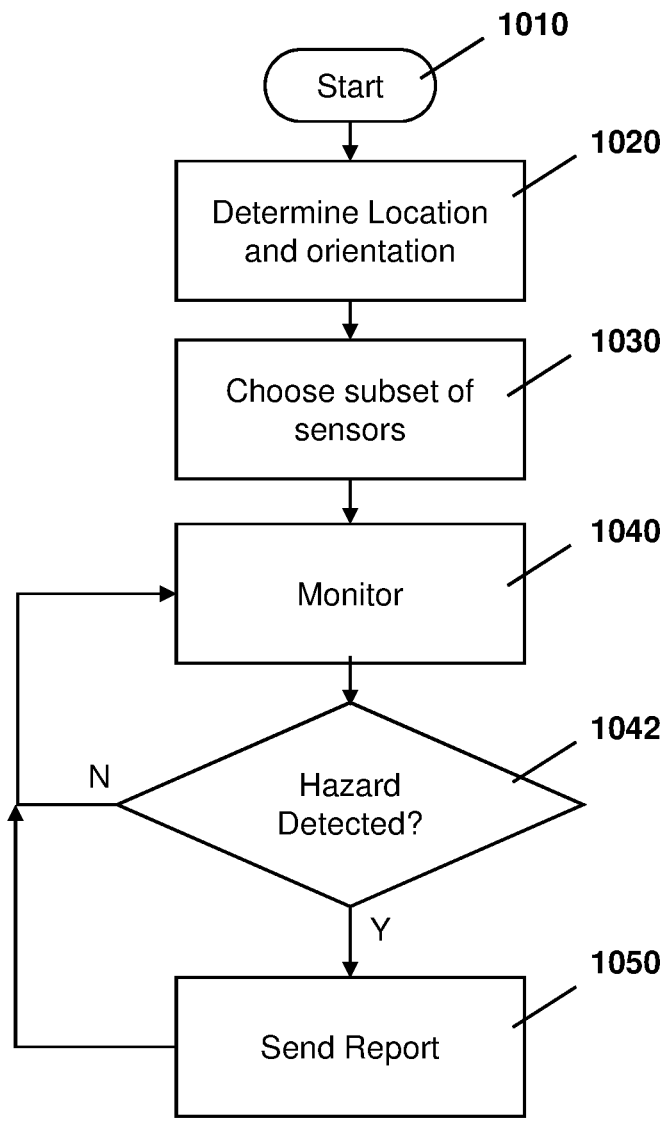
FIG. 10 is a process diagram of a process at a computing device on a parked vehicle for independent sending of sensor information to a moving vehicle.

Reference is now made to FIG. 10, which shows a process of the computing device on the parked vehicle for providing reports to traffic. In accordance with the embodiment of FIG. 10, the process starts at block 1010 and proceeds to block 1020 in which the computing device may determine data about its parked situation. In particular, a computing device on the vehicle may determine the orientation relative to the roadway where the vehicle is parked. The computing device may further determine its location precisely. In some embodiments the computing device on the vehicle may further determine the direction of traffic on the driving line adjacent to where it is parked.

Based on the data determined at block 1020, the process proceeds to block 1030 in which the computing device may choose a subset of sensors in order to monitor an angle or area that cannot be seen by passing traffic. The subset of sensors may take into account the vehicle size to determine the size of the area to be monitored. For example, a cube van may block more of a view then a small coupe.

Thus, for example, if a vehicle is parked parallel to traffic and is parked in the same direction as traffic, the sensors on the front and curb side of the vehicle may be enabled, while the sensors on the rear and traffic side of the vehicle may be powered off. This is done in part because the area that is already visible to the oncoming traffic does not need to be monitored, resulting in energy savings at the parked vehicle by enabling only a subset of sensors.

From block 1030, the process may then proceed to block 1040 in which the subset of sensors that are chosen at block 1030 is used to monitor the surrounding area. The process then proceeds to block 1042 in which a check is made to determine whether a hazard has been detected. If not, the process may proceed back to block 1040 and continue to monitor the surrounding area.

If a hazard is detected at block 1042, the process then proceeds to block 1050 in which a report may be sent to moving vehicles or other ITS system users. Such report may be a broadcast or a unicast report.

In some cases, object reporting can be done in a manner to minimize information that is communicated. For example, the surface of a detected object or hazard could be represented as a point cloud and compressed using techniques of point cloud compression.

The check at block 1042 may determine whether there are perceived objects which may be, or may become, a hazard to the moving traffic. For example, the determination of whether a hazard exists may find whether or not a detected object is moving and whether the detected object is moving towards the roadway. In this way, the parked vehicle only sends messages if it is aware that an object may become a hazard.

Further, the sending of the report at block 1050 may only be done in some cases when a vehicle is approaching the parked vehicle. This awareness may come from either sensors on the parked vehicle or through wireless communications in some cases. For example, if a parked vehicle detects a hazard, it may then turn on sensors such as rear facing lidar or radar, or a communications subsystem, to detect whether a vehicle or ITS station is approaching, in some cases. Thus, the parked vehicle will not send hazard reports if there is no traffic on the roadway to receive such hazard reports.

Further, the monitoring at block 1040 may be done at a reduced sample rate compared to the sample rate used while the vehicle is in motion. This can result in power savings at the parked vehicle.

Parking Garage Optimization

In still a further embodiment, vehicles within a parking garage may be managed or partially managed by the garage infrastructure. Since parking in many cases involves a commercial transaction such as the payment for use of the space. The use of the vehicle sensors by the garage may similarly be part of the commercial transaction. Thus, in exchange for the parking space, the user of the vehicle may provide for monetary payment and use of sensor data from their vehicle.

Data may be provided either directly to the garage infrastructure, or in a peer-to-peer communication directly with other vehicles.

Access to information may be granted using an authentication mechanism so that only the garage infrastructure, or other vehicles associated with the garage infrastructure, may receive and utilize such data.

In accordance with one embodiment of the present disclosure, upon entering a parking area, a vehicle communicates with the garage infrastructure, providing properties such as turning radius, length of vehicle, width of the vehicle, and/or sensor capabilities, among other information. The garage infrastructure may then use these properties to determine an optimum parking position of the vehicle.

The garage infrastructure may assign a parking space to the vehicle. The infrastructure can either communicate the final parking position to the vehicle and the vehicle autonomously drives itself to that space, or the garage infrastructure may provide navigational commands to guide the vehicle into its parking space.

Parking spaces in some cases may not be visually marked, for example with paint, as a garage infrastructure may manage overall space based on the vehicle sizes and shapes that are currently parked there.

Figure 11:
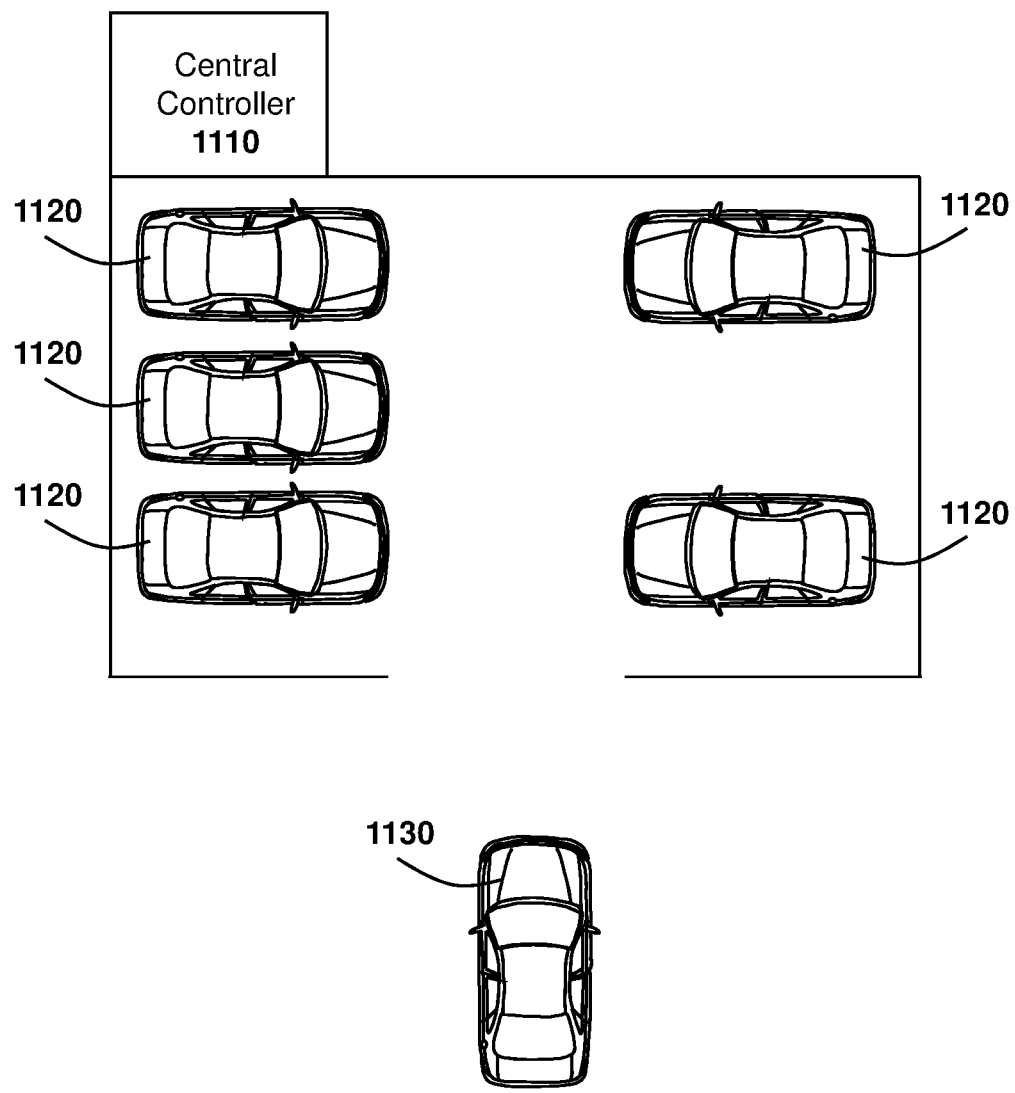
FIG. 11 is a block diagram showing a parking garage or structure using a controller and sensors from vehicles.

Thus, reference is now made to FIG. 11. FIG. 11 shows a parking garage or parking lot in which a computing device, referred to herein as central controller 1110, organizes and manages the parking facilities. The garage does not include any fixed infrastructure sensors in one embodiment. In other embodiments, the garage may use some infrastructure components along with data from other vehicles.

In the embodiment of FIG. 11, a plurality of parked vehicles 1120 may already be parked within the parking garage. A subset of these vehicles may further be providing reports to the controller 1110 in order to allow the controller to determine the location, size and orientation of the other vehicles within the parking facility. A vehicle 1130 arrives at the parking structure and establishes communication with controller 1110. Vehicle 1130 may request a parking space and in response controller 1110 and may ask for information such as the size, turning radius, height, among other information with regard to the vehicle.

Further, the process of parking vehicle 1130 may involve a contractual obligation to provide sensor data while parked, and this obligation may be communicated to the vehicle in response to the request to park. Thus the vehicle may send a message to the parking garage infrastructure requesting to park there and the infrastructure may in turn send a request to the vehicle to keep it sensors on and report on certain events or to keep its communications subsystem operating so that the vehicle can respond to further requests while parked.

Using sensor information from the subset of parked vehicles 1120, controller 1110 may determine a parking spot for vehicle 1130 and therefore assign such parking spot and provide a location or directions on how to access such a parking spot.

Figure 12:
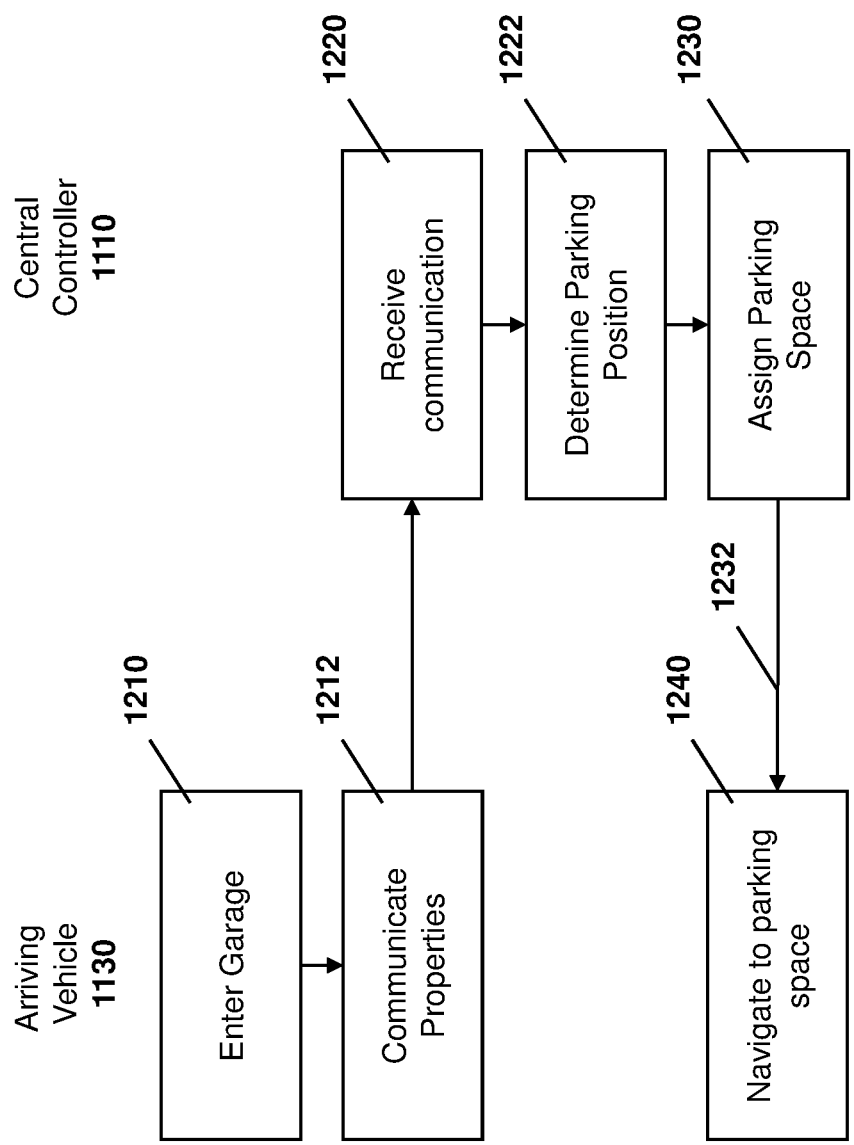
FIG. 12 is a process diagram showing a process between a vehicle and controller to optimize parking functionality.

Reference is now made to FIG. 12 which shows a process between the controller 1110 and the arriving vehicle 1130. The arriving vehicle enters the garage, as shown by block 1210, and subsequently communicates its properties and/or capabilities to the controller, as shown by block 1212.

The controller 1110 receives the communication from the arriving vehicle, shown by block 1220. In one embodiment the communication from the arriving vehicle includes vehicle parameters, and based on the parameters within such communication, the controller determines a parking position for the arriving vehicle, as shown by block 1222. In other embodiments, the controller 110 may receive an initial communication from the arriving vehicle and request parameters or additional parameters in a subsequent message. Based on the received parameters or additional parameters, the controller determines a parking position for the arriving vehicle, as shown by block 1222.

The controller may then assign a parking space as shown by block 1230 and may provide such information to the vehicle, as shown by message 1232.

The vehicle 1130 may then navigate to the parking space, shown by block 1240.

The actions at block 1222 and 1240 may both need input from sensors in currently parked vehicles. Thus, the vehicle 1130 may communicate with a subset of vehicles 1120 shown in FIG. 11. Further, the subset of vehicles 1120 may communicate with the controller 1110.

Based on FIGS. 11 and 12 above, the parking structure may not have its own sensors and relies on the sensors of parked vehicles and the sensors of vehicles in motion within the garage or structure to maintain a view or map of the space within the garage. In this case, the parking garage has communications and processing infrastructure, but either a small amount or no deployed sensors which can be expensive to deploy and maintain. The vehicle sensors from parked vehicles and/or moving vehicles within the parking structure are used to provide more complete and updated information about the state of the parking structure.

Vehicles in motion, whether headed to a parking spot or departing from a parking spot may directly query other vehicles in the garage for sensor information, or send such requests to the infrastructure. The infrastructure may then use a combination of its own fixed sensors (if it has any) and queries to parked vehicles to build a map or view of the current state of the parking structure and provide responses to requesting vehicles based on such map or view.

In some cases, raw sensor data may be transmitted between nodes or in other cases a rendered map may be transmitted. Other options are possible.

While the above describes a parking garage, the processes and systems described could equally be applicable to parking lots, roadside parking spaces, or other parking infrastructure. The infrastructure may be managed by a public entity such as a road authority or municipality, or by a private organization.

Further, while communications are shown to be between an arriving vehicle and the garage infrastructure, in some cases the communications may not be direct, but rather be directed through an intermediate vehicle which may relay the communications.

However, in other cases, the request may be transmitted directly to the infrastructure elements and responses received transmitted directly from the infrastructure elements. By sending the request through infrastructure elements, the request may be trusted or secured.

Utilizing such smart parking infrastructure, communications between moving vehicles and parked vehicles may be relayed through the infrastructure. In some cases, the parked vehicles and the infrastructure may have an authenticated communication link based on the commercial relationship involved with the parking. In some cases, the arriving vehicle and the infrastructure will have an authenticated communication link, while in other cases they may not.

Further, in some cases, to improve latency, a first vehicle entering the garage may request the infrastructure to provide a parking space or information. A controller may then send such request to a second vehicle that is already parked and the second vehicle may then respond directly to the first vehicle. Such transaction improves latency in part because the request is typically a short packet and the response contains sensor data or perceived object descriptions, which can be large. This also saves time in the case where there is a sequence of sensor readings and thus responses over a time period due to a single request message.

The sensor information used to determine a parking spot may also be used to help guide moving vehicles to the proper parking spot. Communications used to request or transmit sensor information or request or receive parking spot assignment or navigation within the parking lot may also be used to communicate payment information. Payment or billing may be processed based on the communicated sensor information including, but not limited to, timestamps and identifying information.

The computing device on the parked vehicle, moving vehicle or ITS station may be any computing device. One simplified diagram of a computing device is shown with regard to FIG. 13.

Figure 13:
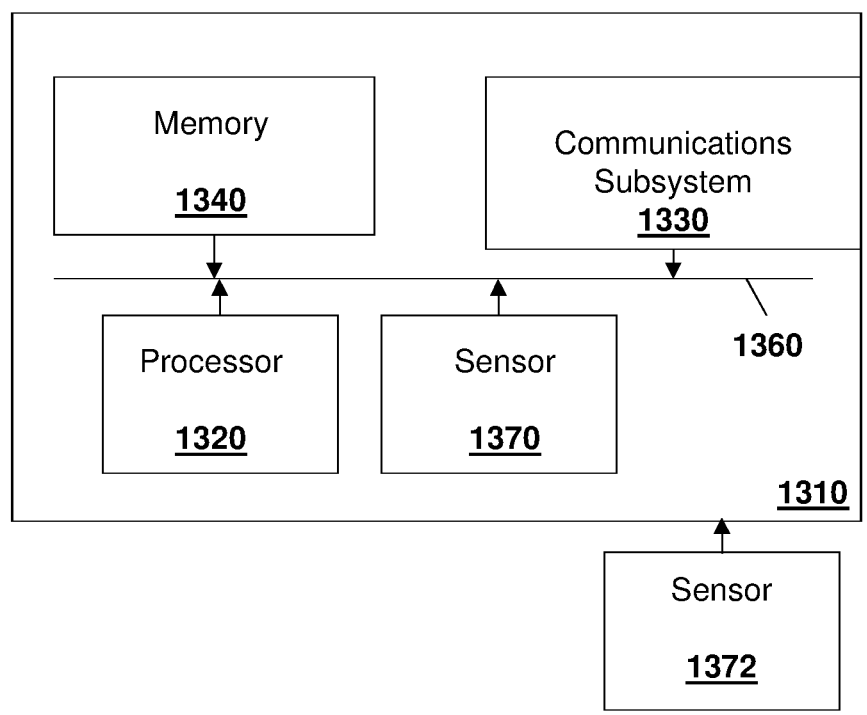
FIG. 13 is a block diagram of a simplified computing device capable of being used with the present embodiments.

In FIG. 13, device 1310 includes a processor 1320 and a communications subsystem 1330, where the processor 1320 and communications subsystem 1330 cooperate to perform the methods of the embodiments described above.

Communications subsystem 1330 allows computing device 1310 to communicate with other devices or network elements. Communications subsystem 1330 may use one or more of a variety of communications types, including but not limited to cellular, satellite, Bluetooth™, Bluetooth™ Low Energy, Wi-Fi, wireless local area network (WLAN), near field communications (NFC), IEEE 802.15, wired connections such as Ethernet or fiber, DSRC, among other options.

As such, a communications subsystem 1330 for wireless communications will typically have one or more receivers and transmitters, as well as associated components such as one or more antenna elements, local oscillators (LOs), and may include a processing module such as a digital signal processor (DSP). As will be apparent to those skilled in the field of communications, the particular design of the communication subsystem 1330 will be dependent upon the communication network or communication technology on which the computing device is intended to operate.

Communications subsystem 1320 may, in some embodiments, comprise multiple subsystems, for example for different radio technologies.

Processor 1320 is configured to execute programmable logic, which may be stored, along with data, on device 1310, and shown in the example of FIG. 13 as memory 1340. Memory 1340 can be any tangible, non-transitory computer readable storage medium. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 1340, device 1310 may access data or programmable logic from an external storage medium, for example through communications subsystem 1330.

Communications between the various elements of device 1310 may be through an internal bus 1360 in one embodiment. However, other forms of communication are possible.

Internal sensors 1370 or external sensors 1372 may provide data to the computing device 1310. Such sensors may include positioning sensors, lidar, radar, image sensors such as cameras, orientation sensors, temperature sensors, vibration sensors, among other options.

Further, if the computing device or moving ITS station is a user equipment, one example user equipment is described below with regard to FIG. 14.

User equipment 1400 may comprise a two-way wireless communication device having voice or data communication capabilities or both. User equipment 1400 generally has the capability to communicate with other computer systems. Depending on the exact functionality provided, the user equipment may be referred to as a data messaging device, a two-way pager, a wireless e-mail device, a smartphone, a cellular telephone with data messaging capabilities, a wireless Internet appliance, a wireless device, a mobile device, an embedded cellular modem or a data communication device, as examples.

Where user equipment 1400 is enabled for two-way communication, it may incorporate a communication subsystem 1411, including a receiver 1412 and a transmitter 1414, as well as associated components such as one or more antenna elements 1416 and 1418, local oscillators (LOs) 1413, and a processing module such as a digital signal processor (DSP) 1420. As will be apparent to those skilled in the field of communications, the particular design of the communication subsystem 1411 will be dependent upon the communication network in which the user equipment is intended to operate.

Network access requirements will also vary depending upon the type of network 1419. In some networks, network access is associated with a subscriber or user of the user equipment 1400. A user equipment may require an embedded or a removable user identity module (RUIM) or a subscriber identity module (SIM) card or a UMTS SIM (USIM) in order to operate on a network. The USIM/SIM/RUIM interface 1444 is normally similar to a card-slot into which a USIM/SIM/RUIM card can be inserted and ejected. The USIM/SIM/RUIM card can have memory and hold many key configurations 1451, and other information 1453 such as identification, and subscriber related information. In other cases, rather than a network 1419, user equipment 1400 may communicate with a non-access node, such as a vehicle, roadside infrastructure, another user equipment, or other peer-to-peer communication.

When required network registration or activation procedures have been completed, user equipment 1400 may send and receive communication signals over the network 1419. As illustrated in FIG. 14, network 1419 can include multiple base stations communicating with the mobile device.

Signals received by antenna 1416 through communication network 1419 are input to receiver 1412, which may perform such common receiver functions as signal amplification, frequency down conversion, filtering, channel selection and the like. Analog to digital (A/D) conversion of a received signal allows more complex communication functions such as demodulation and decoding to be performed in the DSP 1420. In a similar manner, signals to be transmitted are processed, including modulation and encoding for example, by DSP 1420 and input to transmitter 1414 for digital to analog (D/A) conversion, frequency up conversion, filtering, amplification and transmission over the communication network 1419 via antenna 1418. DSP 1420 not only processes communication signals, but also provides for receiver and transmitter control. For example, the gains applied to communication signals in receiver 1412 and transmitter 1414 may be adaptively controlled through automatic gain control algorithms implemented in DSP 1420.

User equipment 1400 generally includes a processor 1438 which controls the overall operation of the device. Communication functions, including data and voice communications, are performed through communication subsystem 1411. Processor 1438 also interacts with further device subsystems such as the display 1422, flash memory 1424, random access memory (RAM) 1426, auxiliary input/output (I/O) subsystems 1428, serial port 1430, one or more keyboards or keypads 1432, speaker 1434, microphone 1436, other communication subsystem 1440 such as a short-range communications subsystem or DSRC subsystem, and any other device subsystems generally designated as 1442. Serial port 1430 could include a USB port, On-Board Diagnostics (OBD) port or other port known to those in the art.

Figure 14:
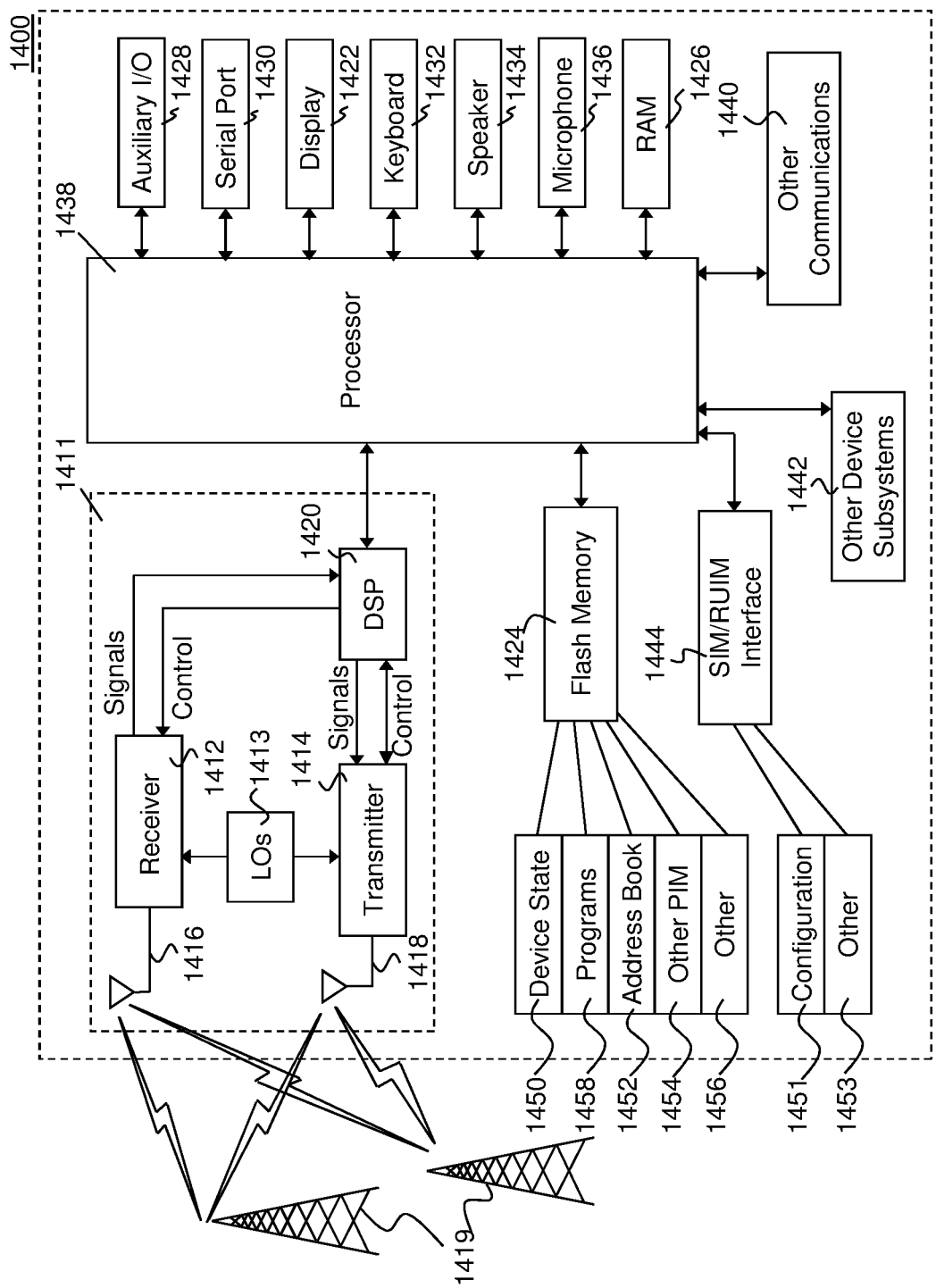
FIG. 14 is a block diagram of an example user equipment which may be used as an ITS station in accordance with the present embodiments.

Some of the subsystems shown in FIG. 14 perform communication-related functions, whereas other subsystems may provide "resident" or on-device functions. Notably, some subsystems, such as keyboard 1432 and display 1422, for example, may be used for both communication-related functions, such as entering a text message for transmission over a communication network, and device-resident functions such as a calculator or task list.

Operating system software used by the processor 1438 may be stored in a persistent store such as flash memory 1424, which may instead be a read-only memory (ROM) or similar storage element (not shown). Those skilled in the art will appreciate that the operating system, specific device applications, or parts thereof, may be temporarily loaded into a volatile memory such as RAM 1426. Received communication signals may also be stored in RAM 1426.

As shown, flash memory 1424 can be segregated into different areas for both computer programs 1458 and program data storage 1450, 1452, 1454 and 1456. These different storage types indicate that each program can allocate a portion of flash memory 1424 for their own data storage requirements. Processor 1438, in addition to its operating system functions, may enable execution of software applications on the user equipment. A predetermined set of applications that control basic operations, including potentially data and voice communication applications for example, will normally be installed on user equipment 1400 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the user equipment such as, but not limited to, e-mail, messages, calendar events, voice mails, appointments, and task items. Further applications, including productivity applications, social media applications, games, among others, may also be loaded onto the user equipment 1400 through the network 1419, an auxiliary I/O subsystem 1428, serial port 1430, short-range communications subsystem 1440 or any other suitable subsystem 1442, and installed by a user in the RAM 1426 or a non-volatile store (not shown) for execution by the processor 1438. Such flexibility in application installation increases the functionality of the device and may provide enhanced on-device functions, communication-related functions, or both.

In a data communication mode, a received signal such as a text message or web page download will be processed by the communication subsystem 1411 and input to the processor 1438, which may further process the received signal for output to the display 1422, or alternatively to an auxiliary I/O device 1428.

A user of user equipment 1400 may also compose data items such as messages for example, using the keyboard 1432, which may be a complete alphanumeric keyboard or telephone-type keypad, either physical or virtual, among others, in conjunction with the display 1422 and possibly an auxiliary I/O device 1428. Such composed items may then be transmitted over a communication network through the communication subsystem 1411.

Where voice communications are provided, overall operation of user equipment 1400 is similar, except that received signals may typically be output to a speaker 1434 and signals for transmission may be generated by a microphone 1436. Alternative voice or audio I/O subsystems, such as a voice message recording subsystem, may also be implemented on user equipment 1400. Although voice or audio signal output is preferably accomplished primarily through the speaker 1434, display 1422 may also be used to provide an indication of the identity of a calling party, the duration of a voice call, or other voice call related information for example.

Serial port 1430 in FIG. 14 may be implemented in a user equipment for which synchronization with a user's desktop computer (not shown) may be desirable, but is an optional device component. Such a port 1430 may enable a user to set preferences through an external device or software application and may extend the capabilities of user equipment 1400 by providing for information or software downloads to user equipment 1400 other than through a wireless communication network. As will be appreciated by those skilled in the art, serial port 1430 can further be used to connect the user equipment to a computer to act as a modem or for charging a battery on the user equipment.

Other communications subsystems 1440, such as a short-range communications subsystem, is a further component which may provide for communication between user equipment 1400 and different systems or devices, which need not necessarily be similar devices. For example, the subsystem 1440 may include an infrared device and associated circuits and components or a Bluetooth™ or Bluetooth™ Low Energy communication module to provide for communication with similarly enabled systems and devices. Subsystem 1440 may further include a WUR radio. Subsystem 1440 may further include a DSRC radio. Subsystem 1440 may further include non-cellular communications such as Wi-Fi or WiMAX, or near field communications, and in accordance with the embodiments above such radio may be capable of being split in some circumstances.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation described above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly a plurality of nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at computing device associated with a parked vehicle, the method comprising:
   receiving a request for sensor information from an external computing device, the request including an area of interest, wherein the request specifies at least one of: four points forming a quadrilateral for the area of interest, or a central point, two angles from a line intersecting the central point, and a radius, wherein the area of interest comprises an area created by the two angles from the central point and the radius on a side opposite the parked vehicle from the central point;
   activating sensors of the parked vehicle;
   obtaining sensor data for the area of interest; and
   providing a response to the external computing device.

2. The method of claim 1, wherein two points are associated with corners of the parked vehicle.

3. The method of claim 1, wherein the request specifies a rate and direction of movement of the external computing device, wherein the computing device updates the area of interest based on the rate and direction of movement.

4. The method of claim 1, wherein the request further includes a time duration and reporting period for the computing device to provide responses.

5. The method of claim 1, further comprising, prior to providing the response:
   filtering the sensor data to identify potential hazards to the external computing device; and
   providing the response with data limited to the potential hazards.

6. The method of claim 1, wherein the activating sensors selectively activates a subset of sensors on the parked vehicle.

7. The method of claim 6, wherein the subset of sensors is determined based on a sensor type identified in the request.

8. The method of claim 7, wherein the subset of sensors is determined based on a direction of the area of interest.

9. A computing device associated with a parked vehicle, the computing device comprising:
   a processor; and
   a communications subsystem,
   wherein the computing device is configured to:
   receive a request for sensor information from an external computing device, the request including an area of interest, wherein the reqest specifies at least one of: four points forming a quadrilateral for the area of interest, or a central point, two angles from a line intersecting the central point, and a radius, wherein the area of interest comprises an area created by the two angles from the central point and the radius on a side opposite the parked vehicle from the central point;
   activate sensors of the parked vehicle;
   obtain sensor data for the area of interest; and
   provide a response to the external computing device.

10. The computing device of claim 9, wherein two points are associated with corners of the parked vehicle.

11. The computing device of claim 9, wherein the request specifies a rate and direction of movement of the external computing device, wherein the computing device updates the area of interest based on the rate and direction of movement.

12. The computing device of claim 9, wherein the request further includes a time duration and reporting period for the computing device to provide responses.

13. The computing device of claim 9, wherein the computing device is further configured to, prior to providing the response:
   filter the sensor data to identify potential hazards to the external computing device; and
   provide the response with data limited to the potential hazards.

14. The computing device of claim 9, wherein the activating sensors selectively activates a subset of sensors on the parked vehicle.

15. The computing device of claim 14, wherein the subset of sensors is determined based on a sensor type identified in the request.

16. The computing device of claim 15, wherein the subset of sensors is determined based on a direction of the area of interest.

17. A computer readable medium for storing instruction code which, when executed by a processor of a computing device associated with a parked vehicle, cause the computing device to:
   receive a request for sensor information from an external computing device, the request including an area of interest, wherein the request specifies at least one of: four points forming a quadrilateral for the area of interest or a central point, two angles from a line intersecting the central point, and a radius, wherein the area of interest comprises an area by the two angles from the central point and the radius on a side opposite the parked vehicle from the central point;
   activate sensors of the parked vehicle;
   obtain sensor data for the area of interest; and
   provide a response to the external computing device.

* * * * *